United States Patent [19]

Kish

[11] Patent Number: 4,611,750

[45] Date of Patent: Sep. 16, 1986

[54] METHOD OF ASSEMBLING AN ACCUMULATOR DEHYDRATOR

[75] Inventor: Arthur S. Kish, Lyndhurst, Ohio

[73] Assignee: Murray Corporation, Cockeysville, Md.

[21] Appl. No.: 654,845

[22] Filed: Sep. 26, 1984

Related U.S. Application Data

[62] Division of Ser. No. 432,257, Dec. 26, 1982, Pat. No. 4,496,378.

[51] Int. Cl.[4] ............................................. B23K 31/02
[52] U.S. Cl. .................................. 228/184; 29/157 R
[58] Field of Search ................ 228/182, 184; 285/286; 29/157 R, 157 T

[56] References Cited

U.S. PATENT DOCUMENTS

| | | |
|---|---|---|
| 3,030,754 | 4/1962 | Root et al. ............................. 55/320 |
| 3,296,777 | 1/1967 | Jackson et al. ....................... 55/462 |
| 3,981,061 | 9/1976 | Jackson et al. ................... 29/157 T |
| 4,122,579 | 10/1978 | Parise .................................... 55/320 |
| 4,270,934 | 6/1981 | Widdowson et al. ................ 55/316 |
| 4,291,548 | 9/1981 | Livesay ......................... 210/DIG. 6 |

Primary Examiner—Kenneth J. Ramsey
Attorney, Agent, or Firm—Irvin A. Lavine

[57] ABSTRACT

A method for assembling an accumulator dehydrator comprising a cap, a fitting and a deflector, the deflector having a body and an arcuate flange extending from it, the method comprising providing a cap having an opening through it, the fitting having a portion smaller than the opening, the steps including placing the fitting on the outside of the cap and inserting the portion of it into the opening, placing the deflector on the inside of the cap and inserting the flange of it into the opening, exteriorly of the fitting, and welding the fitting to the cap.

3 Claims, 11 Drawing Figures

METHOD OF ASSEMBLING AN ACCUMULATOR DEHYDRATOR

This is a division of application Ser. No. 06/432,257, filed Dec. 26, 1982, now U.S. Pat. No. 4,496,378.

This invention relates to a method of assembling accmulator dehydrators.

BACKGROUND OF THE INVENTION

In an automotive air-conditioning system, the compressor pumps heat-laden refrigerant from the evaporator, and compresses the refrigerant, sending it, under high pressure, to the condenser as a superheated vapor. Since the high pressure vapor delivered to the condenser is much hotter than the surrounding air, it gives up its heat to the outside air flowing through the condenser fins.

As the refrigerant vapor gives up its heat, it changes to a liquid. The condensed liquid refrigerant is filtered, dried and temporarily stored under pressure, in the receiver-drier, also known as the "accumulator dehydrator", until it is needed by the evaporator.

Liquid refrigerant is metered from the condenser into the evaporator by an orifice tube which controls the flow of refrigerant in the conditioning system. The orifice tube floods the evaporator with liquid refrigerant. In so doing, the liquid refrigerant picks up heat from the warm air passing through the fins of the evaporator. The warm liquid refrigerant boils into the accumulator dehydrator. The compressor then transmits the warm dehydrated vapor to the condensor for dissipation.

The present invention is concerned particularly with the method of making an accumulator dehydrator or receiver-drier, which, as stated, is a part of the system that is used to store refrigerant. It is located in the low-pressure side of the air-conditioning system and for the most part, contains liquid refrigerant.

The accumulator dehydrator usually consists of a cylindrical metal can with inlet and outlet fittings and, in most cases a a slight glass. It may be divided into two parts: the receiver and the drier.

The accumulator section of the tank or can is a storage compartment to accept the proper amount of excess refrigerant the system requires to insure operation. It is the function of the accumulator section to insure that a steady flow of vapor refrigerant is supplied to the compressor.

The dehydrator section of the tank or can is simply a bag of dessicant, such as molecular sieve, that is capable of absorbing and holding a small quantity of moisture.

A screen is placed in the dehydrator section to catch and hold any trash that may be in the system and prevent its circulation. Through this screen is not serviceable, the cleaned orifice tube that may be cleaned or replaced if necessary.

SUMMARY OF THE INVENTION

The method of assembling an accumulator dehydrator in accordance with the present invention comprises providing a dehydrator cap having an opening through it, providing a fitting having a portion which is smaller than the opening, providing a deflector having a body and an arcuate flange extending from it, then placing the fitting on the outside of the cap and inserting the portion of it into the opening in the cap, placing the deflector on the inside of the cap and inserting the flange into the opening, in exterior or surrounding relation to the fitting, and then welding the fitting to the cap.

It is an object of the present invention to provide an economical and reliable method of assembling an accumulator dehydrator, comprising a cap, a fitting and a deflector.

Another object of the present invention is the provision of such a method which will enable the fabrication of an accumulator dehydrator from readily available parts, and using readily available equipment and methods.

These and other objects and features of the invention will be apparent from the detailed description, together with the accompanying drawings.

BRIEF DESCRIPTION OF THE DRAWINGS

FIG. 4 is a cross-sectional view, taken on the line 4—4 of FIG. 2;

FIG. 6 is a fragmentary cross-sectional view, taken on the line 6—6 of FIG. 1;

DESCRIPTION OF THE PREFERRED EMBODIMENT

Figure 1:
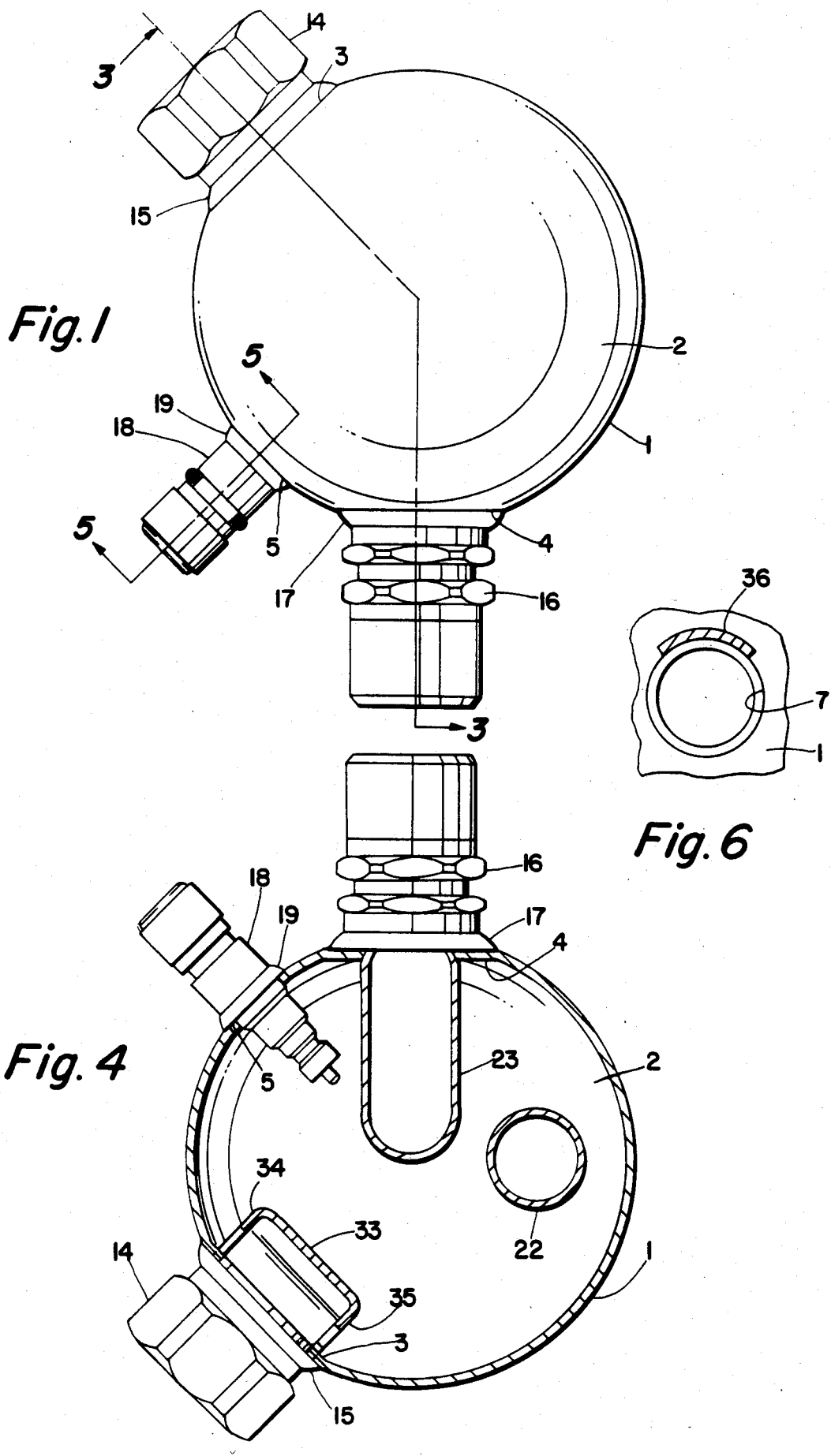
FIG. 1 is a top plan view of a preferred form of the accumulator dehydrator, embodying the invention.
Figure 2:
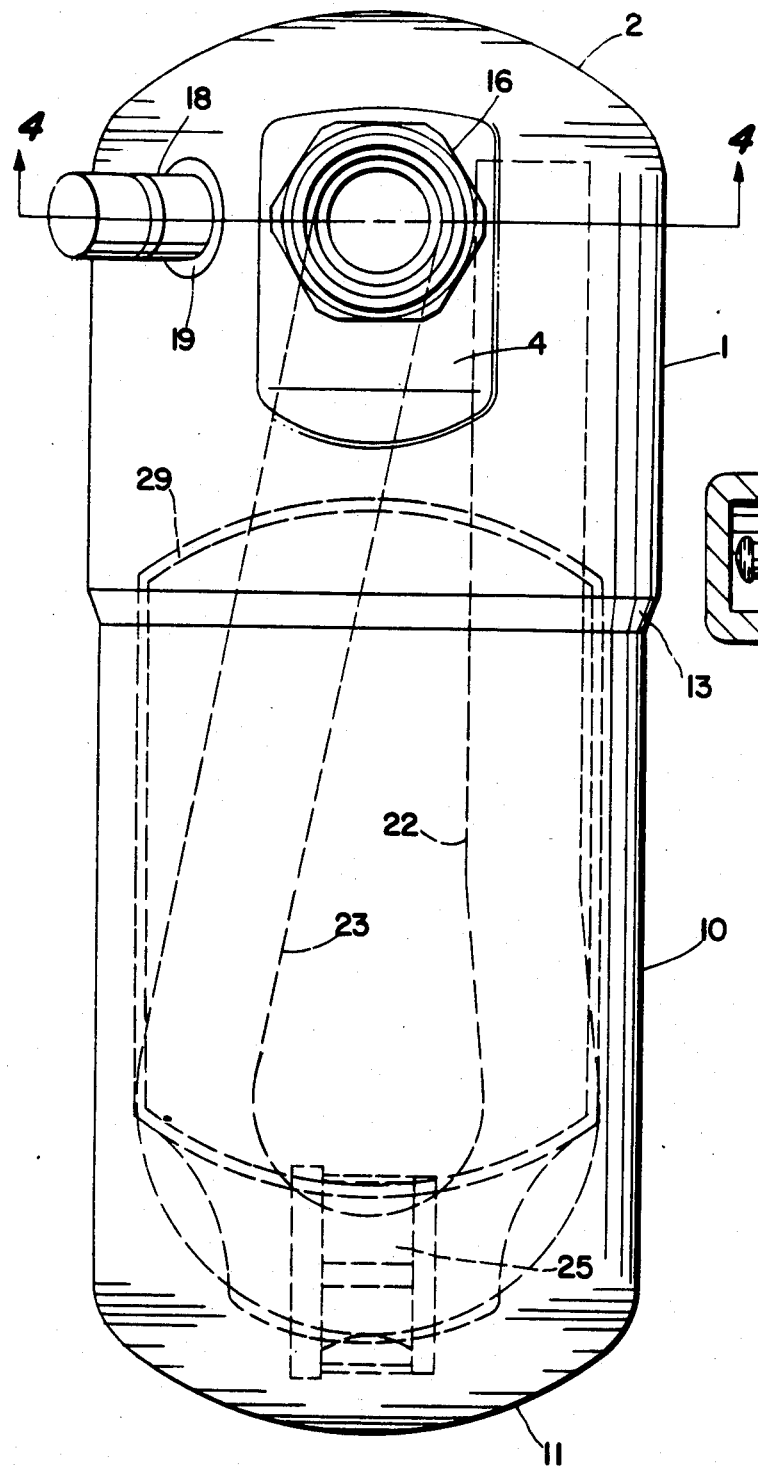
FIG. 2 is a side elevational view of the accumulator dehydrator, as viewed from the lower side of FIG. 1.
Figure 5:
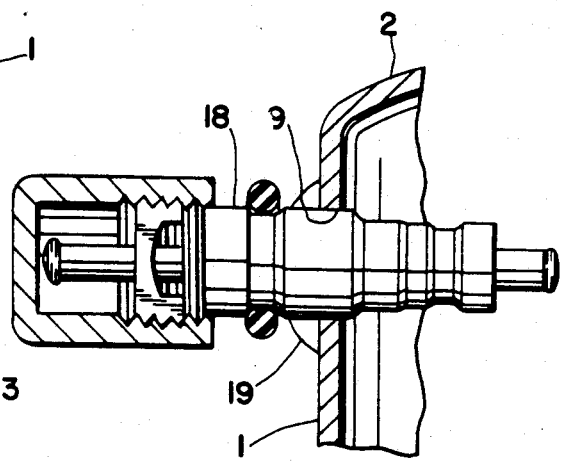
FIG. 5 is a fragmentary cross-sectional view, taken on the line 5—5 of FIG. 1.

Referring more particularly to FIGS. 1 to 10 inclusive of the drawings, the accumulator dehydrator includes an accumulator cap 1, of generally cylindrical shape, having a dome-like upper end 2, and a series of circumferentially-spaced flats 3, 4 and 5 in the cylindrical wall of the cap. The cap is open at the bottom, as at 6.

The cylindrical side wall of the cap 1 is provided with openings 7, 8 and 9, the opening 7 extending through the flat 3, the opening 8 extending through the flat 4, and the opening 9 extending through the flat 5.

The accumulator dehydrator further includes a bottom cap 10, also of generally cylindrical shape, having a dome-like lower end 11, and open at its upper end, as at 12. The bottom cap 10 fits telescopically into the cap 1, and is welded to the cap 1, as at 13.

Secured to the cap 1, in axial alignment with the opening 7 in the flat 3 is a hex-headed fitting 14, which is welded, as at 15, and has a portion thereof extending through the opening 7. The fitting 14 is an inlet fitting, which is adapted to receive fluid from the evaporator (not shown) of the automotive air-conditioning system, and to be discharged into the accumulator dehydrator.

Secured to the cap 1 in axial alignment with the opening 8 in the flat 4 is a fitting 16, which is welded, as at 17, to the flat 4, and has a portion thereof extending through the opening 8. The fitting 16 is an outlet fitting, which is adapted to receive fluid from the accumulator dehydrator to the condenser (not shown) of the automotive air-conditioning system and returned to the evaporator.

Secured to the cap 1, in axial alignment with the opening 9 in the flat 5, is a valve core 18 of the Schrader type, which is welded, as at 19, to the flat 5, and extends through the opening 9. The core 18 is part of a charge fitting or valve through which the system is charged with refrigerant.

The accumulator dehydrator is provided interiorly thereof with a U-shaped tube 20 comprising a bight portion 21 and a pair of upstanding leg portions 22 and 23. The bight portion 21 has a bleed opening or port 24 through the bottom side thereof which is located adjacent to and faces the closed bottom 11 of the bottom cap 10, while the leg portions 22 and 23 are sized to extend substantially the height of the accumulator dehydrator. In addition, there is provided a cylindrical screen assembly 24 which is received about the bight portion 21 and serves to screen out particles in the collected liquid to prevent clogging of the bleed port 24.

The leg portion 22 has an open end 26 located adjacent the closed upper end of the cap 1. The other tube leg 23 has a right angle bend to its open end 27 which is adapted to be received in and permanently connected by swaging to the outlet fitting 16 thus providing for permanent attachment between the tube and the cap 1.

Figure 3:
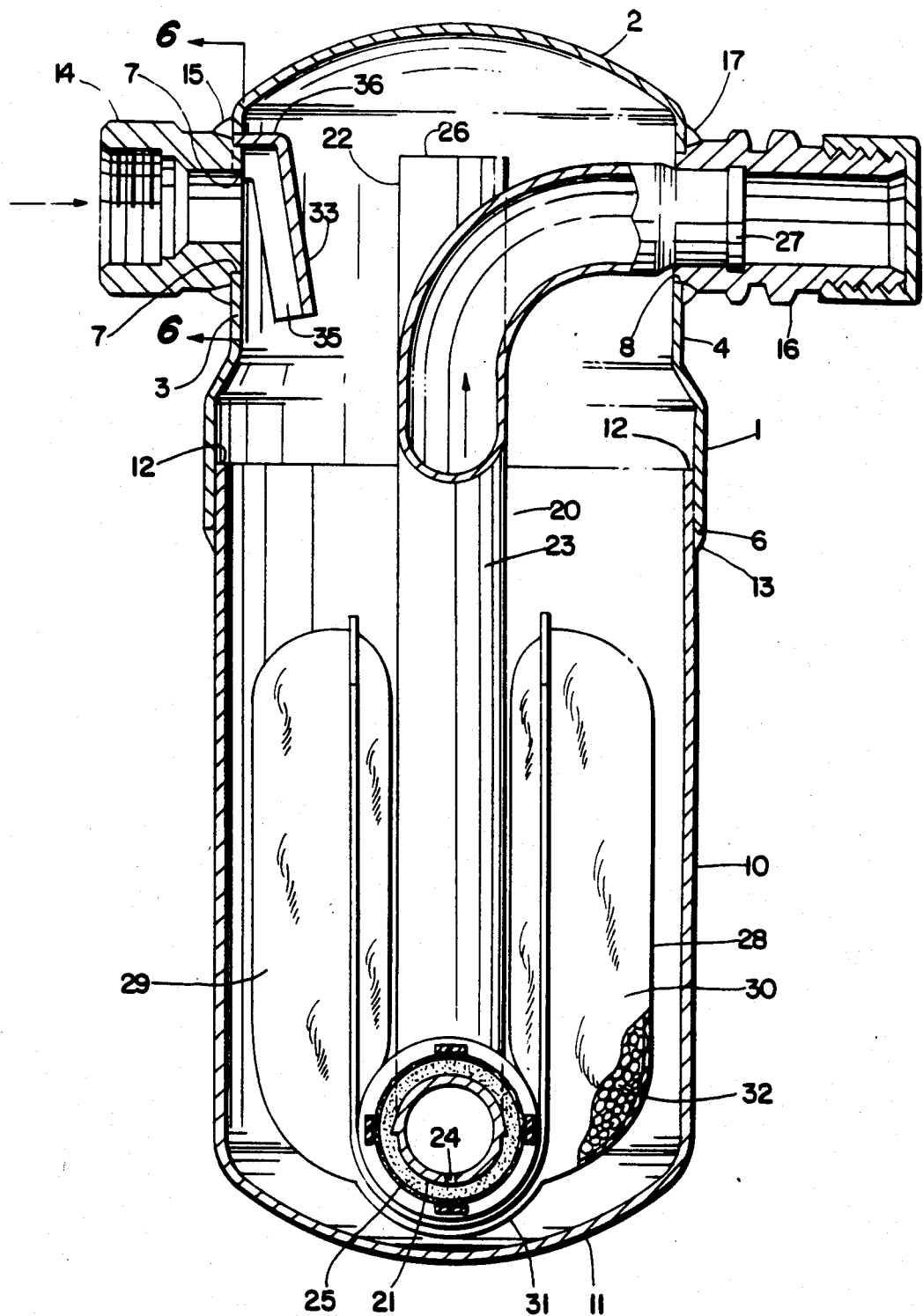
FIG. 3 is a cross-sectional view of the accumulator dehydrator taken on the line 3—3 of FIG. 1.
Figure 8:
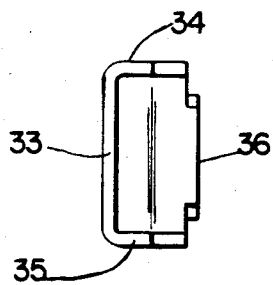
FIG. 8 is an end elevational view of the deflector of FIG. 7.

The accumulator dehydrator is further provided with a hollow porous dessicant container or molecular sieve 28, which is adapted to be received in the lower end of the accumulator dehydrator. The dessicant container is preferably made in the form of two bags or halves, 29 and 30, which as best seen is FIG. 3, are heated-sealed to each other, and are joined by a web 31, which encircles the screen 25. Each bag contains dessicant 32, such for example as molecular sieve.

An important feature of the invention resides in the provision of a deflector for the accumulator dehydrator, which is of unique design or construction, and which can be assembled with upper cap in a unique manner, without the aid of extraneous fasteners.

The deflector is clearly illustrated in FIGS. 3, 4, 6, 7, 8, 9 and 10.

Figure 7:
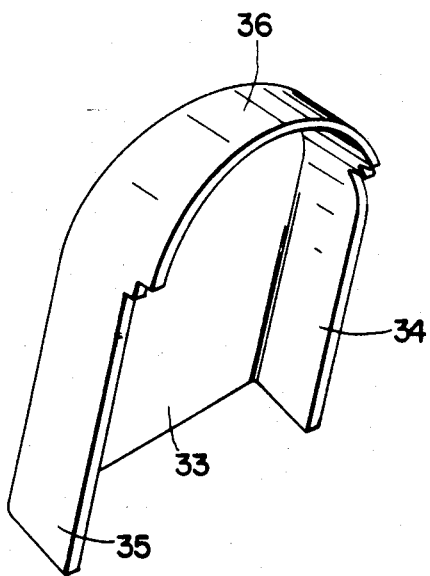
FIG. 7 is a perspective or isometric view of the deflector of the accumulator dehydrator.
Figure 9:
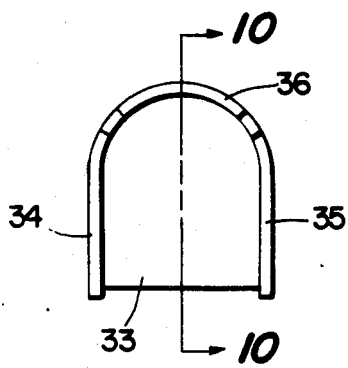
FIG. 9 is a plan view of the deflector of FIG. 7.
Figure 10:
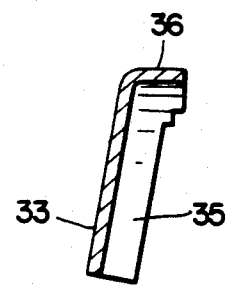
FIG. 10 is a cross-sectional view, taken on the line 10—10 of FIG. 9.

The deflector is preferably made in one piece as a metal stamping, stamped or formed to provide a flat elongated body 33 having downturned flanges 34 and 35, at its side edges, and an arcuate flange 36 at one end. As seen in FIG. 7, the flange 36 extends inwardly beyond the edges of the flanges 34 and 35, to thereby form a tenon whereby the deflector may be attached to the cap 1.

In assembling the deflector with the cap 1 and the fitting 14, the flange 26 is inserted between the hole 7 in the cap, and the portion of the fitting 14 which extends into the hole 7 acts not only to hold the deflector in the position shown in FIG. 3, but also to prevent the deflector from being rotated about the axis of the hole 7. With the parts thus assembled, the weld material 15 is applied, and flows between the parts to permanently hold the deflector in its operative position, as shown in FIGS. 3 and 4.

The incoming vaporous refrigerant is caused to impinge against the body 33 of the deflector to encourage separation of the liquid components (refrigerant, oil, water) and cause same to be deposited in the bottom of the accumulator dehydrator.

With the dessicant (molecular sieve) stored in the dessicant bags, the deposited water is absorbed and retained thereby while the deposited liquid refrigerant and oil is eventually aspirated through the bleed port 24 in vaporous from into bight 21 of the tube 20, where it passes along with the vaporous refrigerant already flowing therethrough and then out the outlet fitting 16 into the compressor (not shown) of the air-conditioning system.

Figure 11:
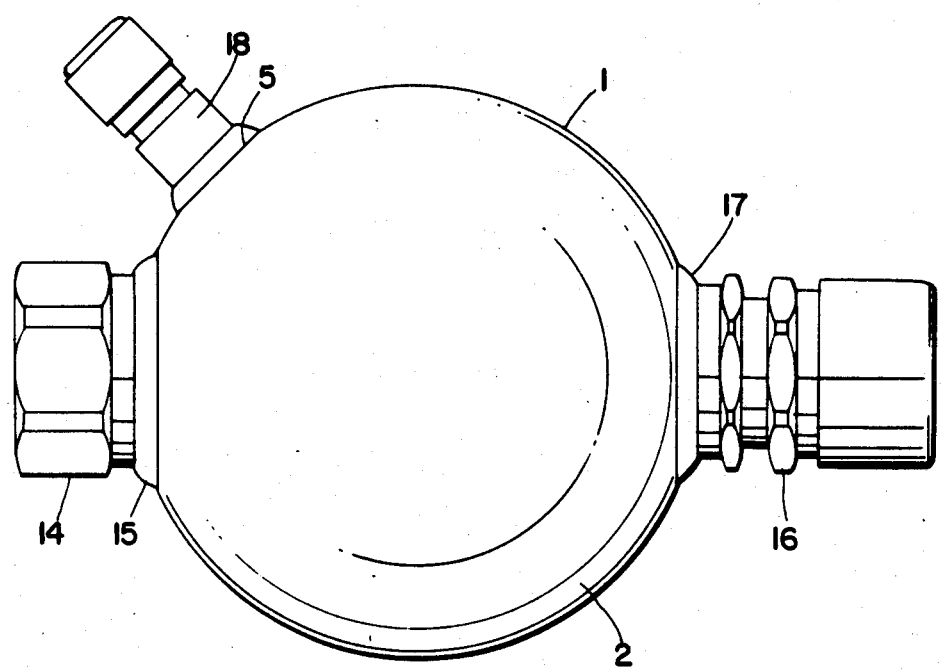
FIG. 11 is a view similar to FIG. 1, but showing that the deflector on the inlet port will operate regardless of the position of the outlet port.

In FIG. 11 of the drawings, a modification is shown, in which the inlet and outlet fittings are disposed at diametrically-opposite sides of the cap. This accumulator dehydrator is basically the same on the inside and bottom half as that herein above described, the only difference being the location of the inlet and outlet fittings to fit different models of General Motors cars. The fittings on the accumulator dehydrators are located depending on how the accumulator is mounted on the car and the bend configuration of the tube and hose assembly that is secured to the accumulator. The accumulator serves the same purpose irrespective of the model car or the fitting location.

While this invention has been described as having a preferred method, it will be understood that it is capable of further modification. This application is, therefore, intended to cover any variations, uses, or adaptations of the invention following the general principles thereof and including such departures from the present disclosure as come within known or customary practice in the art of which this invention pertains, as may be applied to the essential features hereinbefore set forth and fall within the limits of the appended claims.

I claim:

1. A method of assembling an accumulator dehydrator cap, a fitting and a deflector comprising:
    providing a cap having an opening therethrough,
    providing a fitting having a portion smaller than said opening,
    providing a deflector having a body and an arcuate flange extending therefrom,
    placing said fitting on the outside of said cap and inserting said portion into said opening,
    placing said deflector on the inside of said cap and inserting said flange into said opening exteriorly of said fitting, and
    welding said fitting to said cap.

2. The method of claim 1, wherein said welding comprises the placement of weld metal on the exterior of said cap about said fitting where said fitting enters said cap.

3. The method of claim 1, wherein said cap has a surface defining said opening, and wherein said surface and the exterior of said portion of said fitting hold said deflector by engaging said flange when said flange is inserted into said opening.

* * * * *